United States Patent
Chen (10) Patent No.: US 10,397,281 B2
(45) Date of Patent: *Aug. 27, 2019

(54) METHOD, SYSTEM AND SERVER FOR SELF-HEALING OF ELECTRONIC APPARATUS

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,820

(22) Filed: Jul. 31, 2018

(65) Prior Publication Data

US 2018/0337959 A1 Nov. 22, 2018

Related U.S. Application Data

(63) Continuation of application No. 14/924,722, filed on Oct. 28, 2015, now Pat. No. 10,075,477.

(30) Foreign Application Priority Data

Jun. 2, 2015 (TW) .............................. 104117810 A (51) Int. Cl.
*H04L 29/06* (2006.01)
*G06N 20/00* (2019.01)

(52) U.S. Cl.
CPC .......... *H04L 63/205* (2013.01); *G06N 20/00* (2019.01); *H04L 63/1416* (2013.01)

(58) Field of Classification Search
CPC ......... H04L 63/14; H04L 63/205; G06N 5/04; G06N 99/005
See application file for complete search history.

(56) References Cited

U.S. PATENT DOCUMENTS

| | | |
|---|---|---|
| 7,580,994 B1 * | 8/2009 | Fiszman ............. H04L 41/0654 709/223 |
| 2003/0033397 A1 * | 2/2003 | Gurumoorthy ....... H04L 41/046 709/223 |

(Continued)

FOREIGN PATENT DOCUMENTS

CN 102855160 1/2013

OTHER PUBLICATIONS

"Office Action of China Counterpart Application", dated Jan. 25, 2019, p. 1-p. 12.

*Primary Examiner* — Hee K Song
(74) *Attorney, Agent, or Firm* — JCIPRNET (57) ABSTRACT

A method, a system and a server for self-healing of an electronic apparatus are provided. In the method, the components installed in the electronic apparatus are sequentially called and checked to update each component. Then, a self-diagnosis is executed on the electronic apparatus to produce a diagnosis result and the diagnosis result is sent to a server. The server analyzes the diagnosis result, accordingly sets at least one policy for healing the electronic apparatus and sends the at least one policy back to the electronic apparatus. The electronic apparatus transforms the policy into at least one rule adapted for itself and performs the self-healing according to the rules.

20 Claims, 4 Drawing Sheets

(56) References Cited

U.S. PATENT DOCUMENTS

| | | | |
|---|---|---|---|
| 2004/0060044 A1* | 3/2004 | Das | G06F 8/65 717/171 |
| 2006/0112061 A1* | 5/2006 | Masurkar | G06F 11/0709 706/47 |
| 2007/0073631 A1* | 3/2007 | Hinchey | G06N 20/00 706/14 |
| 2007/0288405 A1* | 12/2007 | Strassner | G06N 20/00 706/12 |
| 2007/0294560 A1* | 12/2007 | Muthukumarasamy | G06F 11/2635 714/2 |
| 2008/0016017 A1* | 1/2008 | Biazetti | G06N 20/00 706/45 |
| 2014/0281728 A1* | 9/2014 | Homma | G06F 11/2294 714/37 |
| 2014/0310564 A1* | 10/2014 | Mallige | G06F 11/0781 714/47.1 |
| 2016/0034359 A1* | 2/2016 | Cabrera | G06F 11/1464 714/19 |
| 2016/0274961 A1* | 9/2016 | Thomas | G06F 11/0709 |

* cited by examiner

METHOD, SYSTEM AND SERVER FOR SELF-HEALING OF ELECTRONIC APPARATUS

CROSS-REFERENCE TO RELATED APPLICATION

This application is a continuation application of and claims the priority benefit of U.S. application Ser. No. 14/924,722, filed on Oct. 28, 2015, now allowed, which claims the priority benefit of Taiwan application serial no. 104117810, filed on Jun. 2, 2015. The entirety of each of the above-mentioned patent applications is hereby incorporated by reference herein and made a part of this specification.

BACKGROUND OF THE INVENTION

Field of the Invention

The invention relates to a method and system for updating, and particularly relates to a method, a system and a server for self-healing of an electronic apparatus.

Description of Related Art

In order to meet the needs of enterprise employees or users, the number of computers in an enterprise is continuously increased along with growth of enterprise scale. Facing the ever-changing malware, a network manager of the enterprise has to opportunely modify or update the computer systems in order to ensure information security and service quality. Benefiting from the advanced network technology, when the network manager updates the computers in the enterprise, it is unnecessary to operate each computer on-site, and the network manager can control each of the computers to implement update through a network from a remote end.

However, a specification and an operating environment of each computer are different, if an error occurs after the update, since the computer has no intelligence to automatically correct the error, the network manager has to personally correct the error. It is a heavy burden for the network manager to update and heal a large amount of computers.

SUMMARY OF THE INVENTION

The invention is directed to a method, a system and a server for self-healing of an electronic apparatus, by which a remote server is used to analyze bugs or security holes produced by the electronic apparatus after the electronic apparatus executes the update, and accordingly sets healing policies and provides the same to the electronic apparatus, so as to implement self-healing of the electronic apparatus.

The invention provides a self-healing method of electronic apparatus, which is adapted to execute self-healing when at least one component in an electronic apparatus is updated. In the method, the components installed in the electronic apparatus are sequentially called and checked to update each of the components. Then, a self-diagnosis is executed on the updated electronic apparatus to produce a diagnosis result, and the diagnosis result is sent to a server. The server analyzes the diagnosis result to accordingly set at least one policy for healing the electronic apparatus and sends the at least one policy back to the electronic apparatus. The electronic apparatus transforms the policy into at least one rule adapted for itself and performs the self-healing according to the rules.

In an embodiment of the invention, the step of sequentially calling and checking the components to update each of the components includes following steps. A clone of the components installed in the electronic apparatus is obtained. The components in the clone are sequentially called to check whether each of the components has an update. A context of the component is pushed to a stack when the component has the update, the component is updated, and the context is extracted from the stack and modified. A simulation is performed on the updated component and the modified context by using the clone to confirm a sanity of the updated component and the modified context. If the updated component and the modified context have the sanity, the clone is used to update the corresponding component in the electronic apparatus. Finally, a next component is called for updating until update of all of the components is completed.

In an embodiment of the invention, the step of executing the update to the component includes modifying a file header, a program header, a relative offset of file content or an absolute offset of program content of the component.

In an embodiment of the invention, the step of sequentially calling the components in the clone includes sorting the components according to a parameter of each of the components, so as to sequentially call the components, wherein the parameter includes a risk level, a severity or a priority.

In an embodiment of the invention, the step of extracting the context from the stack and modifying the context includes comparing the context before and after the modification, and transforming one of at least one register, heap variables, a driver interface, library dependencies, environment variables or a combination thereof of the modified context.

In an embodiment of the invention, the step of analyzing the diagnosis result by the server to accordingly set the policy for healing the electronic apparatus includes following steps. The server executes an anomaly detection on the diagnosis result to find a plurality of outliers. A plurality of features in the outliers are extracted to generate a feature vector. The feature vector of each set of at least one sample and at least one label is taken as an input of a joint feature function to execute a structured prediction algorithm to predict the policy used for healing the electronic apparatus.

In an embodiment of the invention, the step of taking the feature vector of each set of the at least one sample and the at least one label as the input of the joint feature function to execute the structured prediction algorithm to predict the policy used for healing the electronic apparatus includes following steps. A semi-supervised learning method is used to establish a machine learning model. The feature vector of the sample and the label is input to the machine learning model to obtain a plurality of feature vectors of predicted outputs. Then, the input feature vector and the obtained feature vectors of predicted outputs are combined to generate the joint feature function. Finally, the joint feature function is fed back to the machine learning model to train the machine learning model, and accordingly predict the policy used for healing the electronic apparatus.

In an embodiment of the invention, the step of transforming the policy into the rules adapted for the electronic apparatus and performing the self-healing according to the rules includes merging the rules with a function of the corresponding component, covering the function of the corresponding component with the rules, or adding the rules after removing the function of the corresponding component.

The invention provides a self-healing system of electronic apparatus, which includes an electronic apparatus and a server. The electronic apparatus includes a first communication module, a component update module, a self-diagnosis module and a self-healing module. The first communication module is used for connecting a network. The component update module is used for sequentially calling and checking at least one component installed in the electronic apparatus to update each of the components. The self-diagnosis module is used for executing a self-diagnosis on the updated electronic apparatus to produce a diagnosis result, and transmitting the diagnosis result through the first communication module. The server includes a second communication module and a policy setting module. The second communication module is used for connecting the network and receiving the diagnosis result transmitted by the first communication module through the network. The policy setting module is used for analyzing the diagnosis result, and accordingly setting at least one policy for healing the electronic apparatus and sending the at least one policy back to the electronic apparatus through the second communication module. The self-healing module of the electronic apparatus transforms the policy into at least one rule adapted for the electronic apparatus and performs the self-healing of the electronic apparatus.

In an embodiment of the invention, the component update module further obtains a clone of the components installed in the electronic apparatus, sequentially calls the components in the clone to check whether each of the components has an update, pushes a context of the component having the update to a stack to update the component, extracts the context from the stack and modifies the same, and performs a simulation on the updated component and the modified context by using the clone to confirm a sanity of the updated component and the modified context. If the updated component and the modified context have the sanity, the component update module uses the clone to update the corresponding component in the electronic apparatus, and continually calls a next component for updating until update of all of the components is completed.

In an embodiment of the invention, the component update module modifies a file header, a program header, a relative offset of file content or an absolute offset of program content of the component.

In an embodiment of the invention, the component update module sorts the components according to a parameter of each of the components, so as to sequentially call the components, wherein the parameter includes a risk level, a severity and a priority.

In an embodiment of the invention, the component update module compares the context before and after the modification when the component update module extracts the context from the stack, and transforms one of a least one register, heap variables, a driver interface, library dependencies, environment variables or a combination thereof of the modified context.

In an embodiment of the invention, the policy setting module includes an anomaly detection module, a feature extracting module and a structure prediction module. The anomaly detection module executes an anomaly detection on the diagnosis result to find a plurality of outliers. The feature extracting module extracts a plurality of features in the outliers to generate a feature vector. The structure prediction module takes the feature vector of each set of at least one sample and at least one label as an input of a joint feature function to execute a structured prediction algorithm to predict the policy used for healing the electronic apparatus.

In an embodiment of the invention, the structure prediction module establishes a machine learning model by using a semi-supervised learning method, inputs the feature vector of the sample and the label to the machine learning model to obtain a plurality of feature vectors of predicted outputs, combines the input feature vector and the obtained feature vectors of predicted outputs to generate the joint feature function, and feeds back the joint feature function to the machine learning model to train the machine learning model, and accordingly predicts the policy used for healing the electronic apparatus.

In an embodiment of the invention, the self-healing module merges the rules with a function of the corresponding component, covers the function of the corresponding component with the rules, or adds the rules after removing the function of the corresponding component.

The invention provides a server including a communication module and a policy setting module. The communication module is used for connecting a network and receiving a diagnosis result transmitted by an electronic apparatus through the network, wherein the diagnosis result is produced by the electronic apparatus executing a self-diagnosis after the electronic apparatus executes updating to at least one component installed therein. The policy setting module is used for analyzing the diagnosis result, and accordingly setting at least one policy for healing the electronic apparatus and sending the at least one policy back to the electronic apparatus through the communication module, to enable the electronic apparatus to perform a self-healing according to the at least one policy.

According to the above descriptions, in the method, system and server for self-healing of electronic apparatus of the invention, the electronic apparatus performs self-maintenance after executing update, and transmits a diagnosis result of self-diagnosis to the server if the electronic apparatus cannot maintain a normal operation of the component. The server sets a self-healing policy by using a machine learning model, and provides the same to the electronic apparatus. The electronic apparatus then performs the self-healing according to the policy. In this way, a maintenance burden on the network manager is mitigated and a stable service quality is provided.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Referring to a specification of a service level agreement (SLA), in order to maintain quality of service (QoS) when a computer updates components therein, an incremental update method is adopted in the invention to sequentially update the components, so as to avoid a situation that the update influences running of the service. If it is discovered that a self-maintenance is failed after the update, a cloud server uses a machine learning model (MLM) to analyze self-diagnosis information of the electronic apparatus, and sets a policy for healing the electronic apparatus. The policy is given to the electronic apparatus for being transformed into suitable rules for implementation. In this way, smooth running of the service on the electronic apparatus is ensured.

Figure 1:
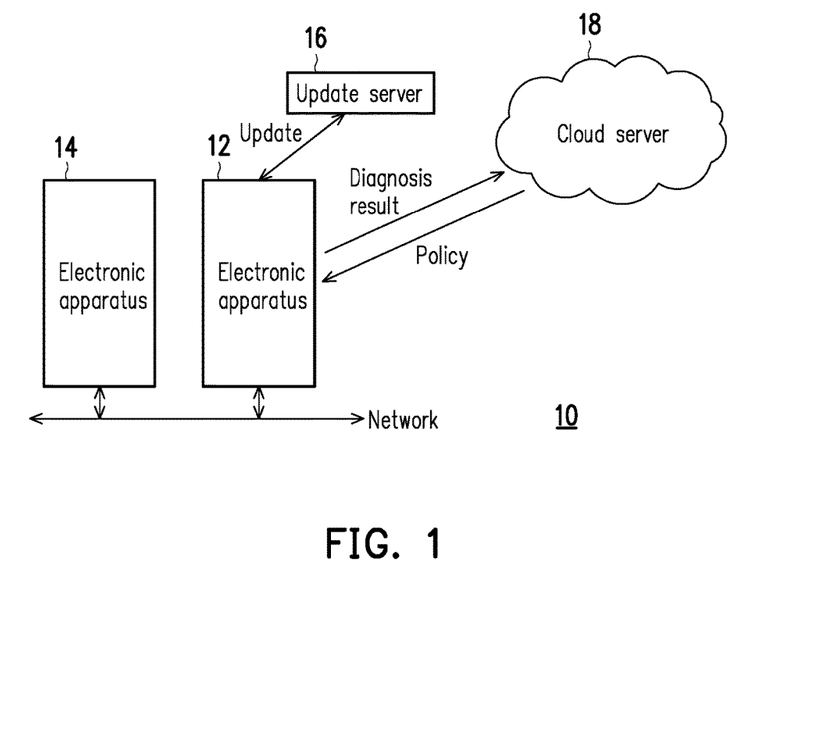
FIG. 1 is a schematic diagram of a self-healing system of electronic apparatus according to an embodiment of the invention.

FIG. 1 is a schematic diagram of a self-healing system of electronic apparatus according to an embodiment of the invention. Referring to FIG. 1, the self-healing system 10 of the present embodiment includes electronic apparatuses 12 and 14, an update server 16 and a cloud server 18 which are connected through a network. The electronic apparatuses 12 and 14 are, for example, computers, workstations or servers in an enterprise, and are adapted to serve enterprise employees or clients.

Taking the electronic apparatus 12 as an example, a management program similar to a human autonomic nervous system is installed therein capable of calling components in the electronic apparatus 12 and connecting the update server 16 through a network connection for checking whether an update respiratory in the server 16 has the components of a new version. If yes, the components are updated. The electronic apparatus 12, for example, performs the update by adopting an active update method such as application hook or according to a predetermined time or predetermined conditions, etc. The electronic apparatus 12 can also perform the update by adopting a passive update method such as exception handler, etc., which is not limited by the invention.

The management program, for example, adopts an incremental update method to download a new part of the component only, and attaches the same to an existing component file without downloading the whole component file, so as to decrease a bandwidth required for updating the component. Such update only delays a service of the electronic apparatus 12 slightly without interrupting the service, and it also unnecessary to reboot the electronic apparatus 12.

After the update is completed, the management program further checks whether the updated software has a bug or a security hole, and tries a self-maintenance. If the self-maintenance cannot maintain a normal operation of the component, the management program executes a self-diagnosis function and sends a diagnosis result of health disorder to the cloud server 18. The cloud server 18 uses a machine learning model to analyze the diagnosis result provided by the electronic apparatus 12, produces a policy used for healing the electronic apparatus 12, and sends the same to an agent program of the electronic apparatus 12. The agent program transforms the policy into a plurality of rules adapted for the electronic apparatus 12, and applies the same to an original function to implement the self-healing of the electronic apparatus 12.

Figure 2:
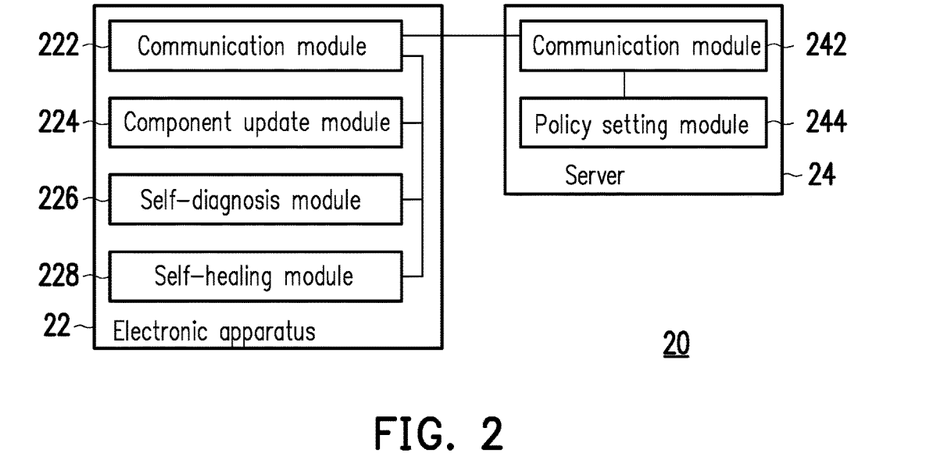
FIG. 2 is a block diagram of a self-healing system for electronic apparatus according to an embodiment of the invention.

To be specific, FIG. 2 is a block diagram of a self-healing system for electronic apparatus according to an embodiment of the invention. Referring to FIG. 2, the self-healing system 20 includes an electronic apparatus 22 and a server 24. The electronic apparatus 22 is, for example, a computing device having a computation capability such as a server, a workstation or a personal computer (PC), or a mobile device such as a mobile phone, or a tablet PC. The server 24 is, for example, a workgroup-level server, a department-level server or an enterprise-level server having a strong computation capability, which is used for managing resources and providing services to external users through a network, though the invention is not limited thereto.

The electronic apparatus 22 includes a communication module 222, a component update module 224, a self-diagnosis module 226 and a self-healing module 228. The server 24 includes a communication module 242 and a policy setting module 244. In the present embodiment, these modules are, for example, programs or software stored in a storage device (not shown) of the electronic apparatus 22 or the server 24, which can be loaded into a processor (not shown) of the electronic apparatus 22 or the server 24 and executed by the same to implement the self-healing method of the present embodiment. On the other hand, in another embodiment, these modules can also be implemented by physical circuits or a combination of software and hardware having functions of these modules, so as to implement the self-healing method of the invention.

The storage device is, for example, a fixed or movable random access memory (RAM) of any type, a read-only memory (ROM), a flash memory, or a similar device or a combination of the above devices. It should be noticed that the storage unit of the present embodiment is not limited to be a single memory device, and the above modules can also be separately stored in two or more memory devices of the same or different types.

The processor is connected to the storage device, and is, for example, a central processing unit (CPU) having a single core or a plurality of cores, or other programmable general purpose or special purpose microprocessor, digital signal processor (DSP), programmable controller, application specific integrated circuit (ASIC) or other similar devices or a combination of the above devices. In the present embodiment, the processor is used for accessing and executing the modules recorded in the storage device, so as to implement the self-healing method of the embodiment of the invention. The processing unit of the present embodiment is not limited to be a single processing device, which can also be implemented by two or more processing devices.

Figure 3:
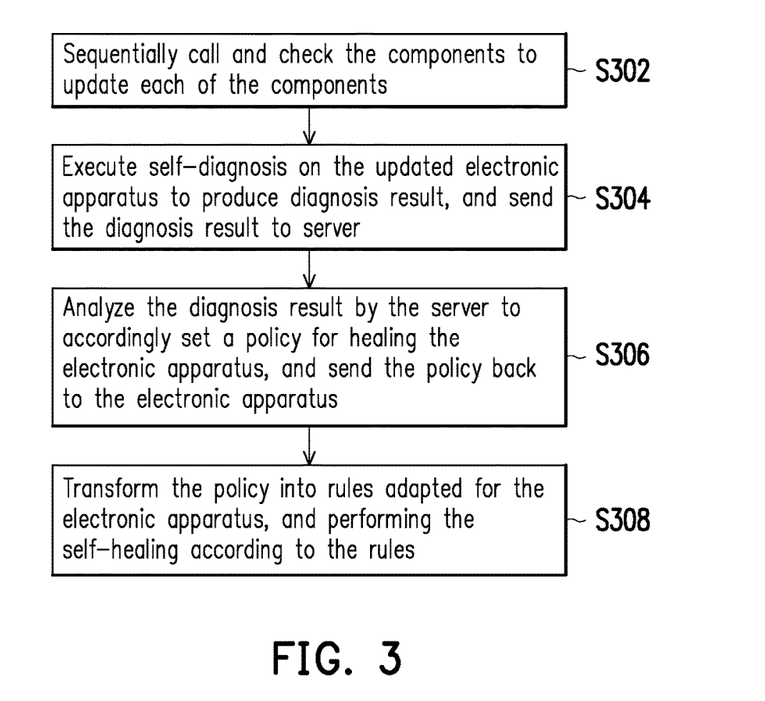
FIG. 3 is a flowchart illustrating a self-healing method of electronic apparatus according to an embodiment of the invention.

FIG. 3 is a flowchart illustrating a self-healing method of electronic apparatus according to an embodiment of the invention. Referring to FIG. 2 and FIG. 3, the self-healing method of the present embodiment is adapted to the self-healing system 20 of FIG. 2. A detailed flow of the self-healing method of the present embodiment is described below with reference to various components in the self-healing system 20.

First, the component update module 224 of the electronic apparatus 22 sequentially calls and checks components installed in the electronic apparatus 22 to update each of the components (step S302). The components include application programs, kernel, drivers of the electronic apparatus 22, and all of binaries in a basic input and output system (BIOS), for example, processes, executables and firmware, though the embodiment is not limited thereto.

Figure 4:
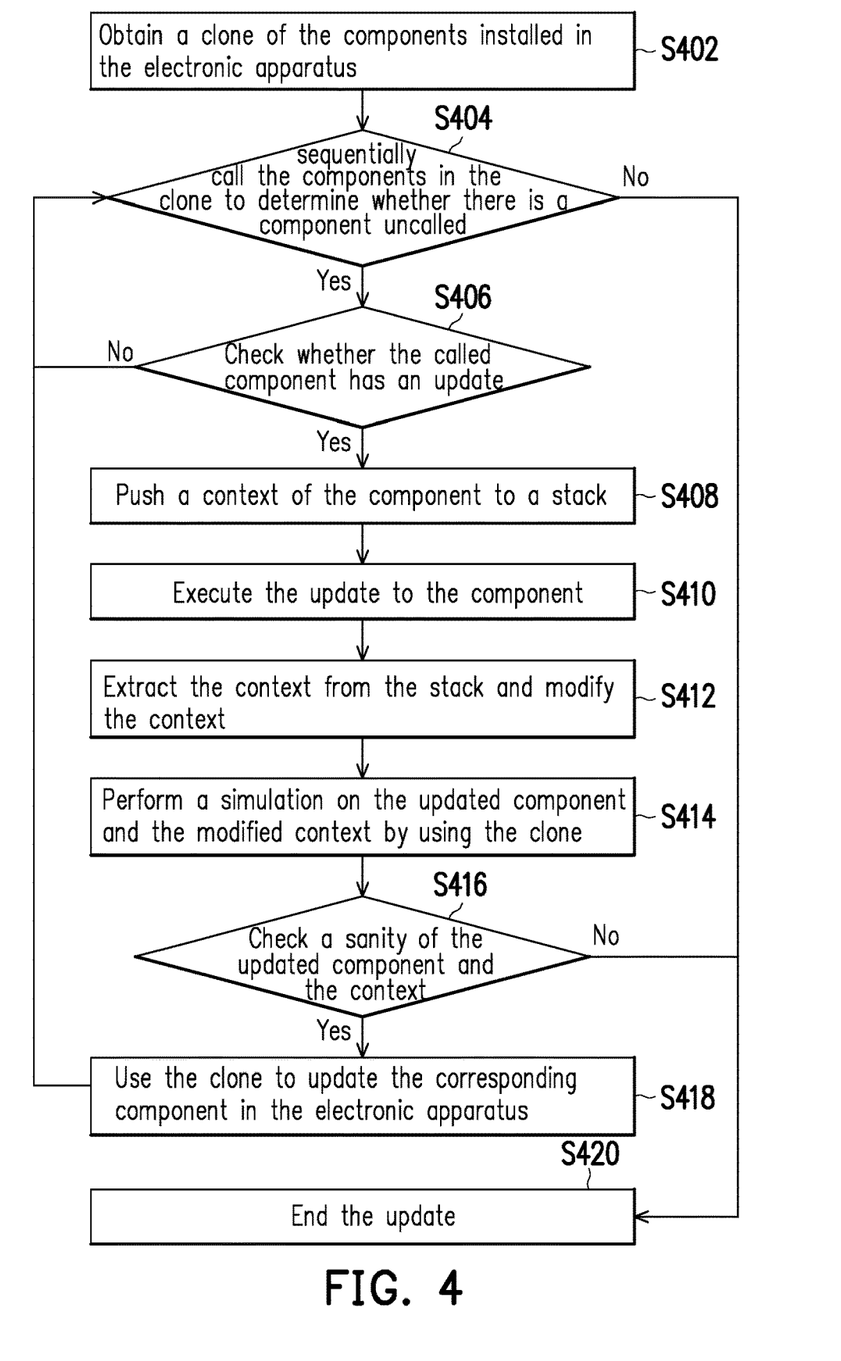
FIG. 4 is a flowchart illustrating a component updating method according to an embodiment of the invention.

In detail, FIG. 4 is a flowchart illustrating a component update method according to an embodiment of the invention. Referring to FIG. 2 and FIG. 4, when the electronic apparatus executes component update, the component update module 224, for example, first obtains a clone of the components installed in the electronic apparatus (step S402). The clone is, for example, a rewritable snapshot of data related to the component in the electronic apparatus, which can be provided to the component update module 224 to perform a simulation and a test on the updated component in advance, and after it is determined there is no error occurred, the result takes effect on the electronic apparatus, so as to avoid errors probably caused by direct update.

Then, the component update module 224 sequentially calls the components in the clone and determines whether there is other component that is not called (step S404). The component update module 224, for example, sorts the components according to a risk level, severity, priority or other parameters of each of the components, and sequentially calls these components to perform update one-by-one.

If the component update module 224 determines there still has uncalled component, component update module 224 calls the component and checks whether the component has an update (step S406). The component update module 224 is connected to the update server on the network through the communication module 222, and checks whether there is a new version of the component for updating. If the component does not have the update, the flow returns to the step S404, and the component update module 224 sequentially calls a next component. Conversely, If the component has the update, the component update module 224 first pushes a context of the component in the clone to a stack (step S408), and updates the component (step S410). The component update module 224, for example, modifies a file header, a program header, a relative offset of file content or an absolute offset of program content of the component, though the embodiment is not limited thereto.

Then, the component update module 224 extracts the context from the stack and modifies the same (step S412). If a context aware method is adopted, the extracted context can be continuously used in the component of the new version. However, if the context is changed in the update process, further transformation is required. In this case, after the component update module 224 extracts the context from the stack, the component update module 224 compares the context before and after the modification, for example, checks whether the register used in the context is changed, and accordingly transforms one of at least one register, heap variables, a driver interface, library dependencies, environment variables or a combination thereof of the modified context.

After the modification, the component update module 224 performs a simulation on the updated component and the modified context by using the clone (step S414), so as to confirm a sanity of the updated component and the modified context (step S416). If the component update module 224 determines that the updated component and the modified context have a bug or a security hole during the simulation, it is confirmed that the updated component and the modified context do not have the sanity, and the update is ended (step S420).

If the component update module 224 determines that the updated component and the context thereof have the sanity, component update module 224 updates the corresponding component in the electronic apparatus by using the clone (step S418), and the flow returns to the step S404 to continually call a next component to perform update. When the component update module 224 updates the component by using the clone, the component update module 224, for example, first suspends programs running in the electronic apparatus, and then recovers the normal operation of the electronic apparatus after the component is updated, so as to avoid data error probably occurred during the update process. Until update of all of the components is completed, i.e., in the step S404, the component update module 224 determines that no other component that is not called, the component update module 224 ends the update (step S420).

In the present embodiment, by adopting the aforementioned incremental patching method to replace a full patching method to sequentially update the components, the update only slightly delays the service of the electronic apparatus 22 without interrupting the service. In this way, the electronic apparatus 22 can still maintain running of the service during the update process. Moreover, the electronic apparatus 22 can also use a timer to periodically trigger the component update module 224 to check whether the components in the electronic apparatus 22 have the updates, and execute component update and the self-healing method of the embodiment. In this way, the quality of service (QoS) of the electronic apparatus 22 is ensured.

It should be noted that in the aforementioned embodiment, simulation and test of the updated component are executed in the electronic apparatus 22. However, in other embodiments, as a bandwidth of the network supports, the simulation and test of the updated component can also be executed by other electronic apparatus (for example, the electronic apparatus 14 in FIG. 1) on the network or a cloud server (for example, the cloud server 18 in FIG. 1). Namely, another apparatus or the cloud server may obtain the clone and execute the update and simulation, and after the simulation is ended, the modified clone is transmitted back to the electronic apparatus 22 for updating the corresponding component in the electronic apparatus 22, by which the effect if component update is also achieved.

Referring back to the flow of FIG. 3, after the component update module 224 completes updating the component, the self-diagnosis module 226 of the electronic apparatus 22 executes a self-diagnosis on the updated electronic apparatus 22 to produce a diagnosis result, and sends the diagnosis result to the server 24 through the communication module 222 (step S304). The self-diagnosis module 226 is, for example, a management program installed on the electronic apparatus 22 that is similar to an anti-virus software. The self-diagnosis module 226 checks whether the updated electronic apparatus 22 has a bug or a security hole, and if yes, the self-diagnosis module 226 tries to perform self-maintenance. If the self-maintenance is failed, the self-diagnosis module 226 executes the self-diagnosis, and takes a discovered problem, syndrome and environment parameters of the electronic apparatus 22 as the diagnosis result and transmits the same to the server 24.

The communication module 242 of the server 24 receives the diagnosis result transmitted by the electronic apparatus 22, and the policy setting module 244 analyzes the diagnosis result to accordingly set a policy used for healing the electronic apparatus 22, and sends the policy back to the electronic apparatus 22 through the communication module 242 (step S306). The policy setting module 244, for example, produces the policy used for healing the electronic apparatus 22 by training a machine learning model established according to a semi-supervised learning method.

Figure 5:
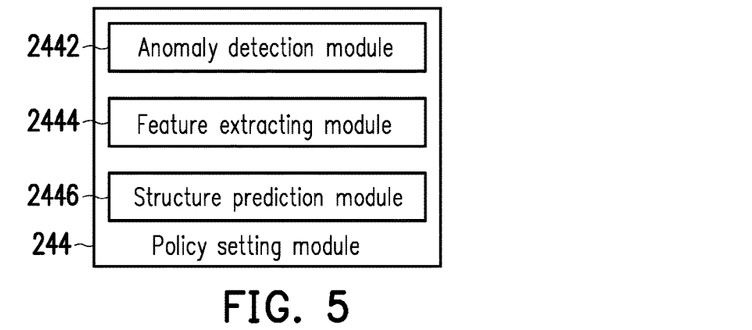
FIG. 5 is a block diagram of a policy setting module according to an embodiment of the invention.
Figure 6:
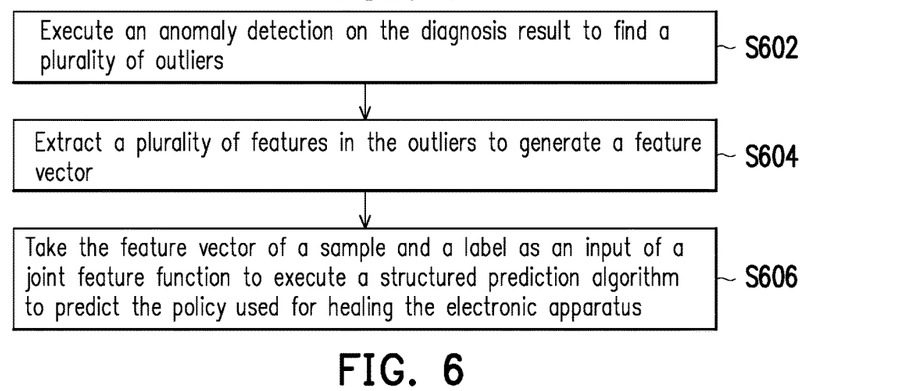
FIG. 6 is a flowchart illustrating a policy setting method according to an embodiment of the invention.

In detail, FIG. 5 is a block diagram of a policy setting module according to an embodiment of the invention. FIG. 6 is a flowchart illustrating a policy setting method according to an embodiment of the invention. Referring to FIG. 5 and FIG. 6, in the present embodiment, detailed components and functions thereof in the policy setting module 244 of FIG. 2 are described. The policy setting module 244 includes an anomaly detection module 2442, a feature extracting module 2444 and a structure prediction module 2446. A detailed flow of the policy setting method of the present embodiment is described below with reference to the above components.

First, the anomaly detection module 2442 executes an anomaly detection on the received diagnosis result to find a plurality of outliers (step S602). The outliers, for example, include a global outlier in the diagnosis result that is obviously different from other data collections, a contextual outlier obtained according to a specific context of data and a collective outlier occurred on a specific sub-collection.

Then, the feature extracting module 2444 extracts a plurality of features in the outliers to generate a feature vector (step S604). The feature extraction is an extension of feature selection, by which a data collection is projected from a high-dimensional space to a low-dimensional space, and a main difference between the feature extraction and the feature selection is that in the feature extraction, the selected data collection can be composed of the original features after linear or non-linear computation. If each feature of each batch of data is taken as a coordinate of such batch of data, all of the data can be taken as a plurality of points distributed in the high-dimensional space, and the number of features of each batch of data is a dimension of such batch of data.

Finally, the structure prediction module 2446 takes the feature vector of a sample and a label as an input of a joint feature function to execute a structured prediction algorithm to predict the policy used for healing the electronic apparatus (step S606). The structure prediction module 2446 produces the policy used for healing the electronic apparatus 22 by training a machine learning model established according to a semi-supervised learning method.

Figure 7:
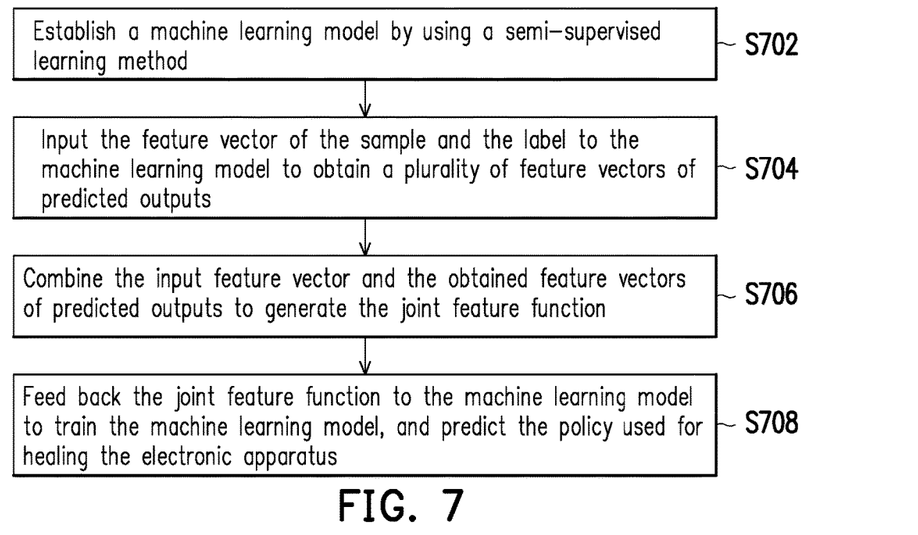
FIG. 7 is a flowchart illustrating a structure prediction method according to an embodiment of the invention.

In detail, FIG. 7 is a flowchart illustrating a structure prediction method according to an embodiment of the invention. Referring to FIG. 5, FIG. 6 and FIG. 7, detailed steps of the step S606 of FIG. 6 are introduced below.

First, the structure prediction module 2446 establishes a machine learning model by using a semi-supervised learning method (step S702). The semi-supervised learning method is to train the machine learning model (for example, a function) by simultaneously using a small amount of labelled data and a large amount of unlabelled data, and predict new data according to such model. Since the semi-supervised learning method does not take too much time to label data, and can achieve higher label correctness, by adopting the semi-supervised learning method, a better prediction effect can be achieved by only providing a small amount of samples.

Then, the structure prediction module 2446 inputs the feature vector of the sample and the label extracted by the feature extracting module 2444 into the aforementioned machine learning model to obtain a plurality of feature vectors of predicted outputs (step S704). The structure prediction module 2446, for example, predicts an output of such model (i.e., the function) for any possible input value by observing some training data (including input objects and predicted outputs). Accuracy of the machine learning model is highly related to representation of the input object, and in the present embodiment, the input object is transformed into a feature vector, which includes a plurality of features of the described object.

Then, the structure prediction module 2446 combines the input feature vectors and the feature vectors of the predicted outputs to generate the joint feature function (step S706). The structure prediction module 2446, for example, maps a training sample (i.e., the feature vector) x and a candidate prediction y to a vector with a length of n, the training sample x and the candidate prediction y may adopt any structure, and n is determined according to an actual requirement, though it is a constant for each model.

Finally, the structure prediction module 2446 takes the joint feature function as training data and sends the same back to the machine learning model, so as to train the machine learning model, and finally predicts the policy used for healing the electronic apparatus 22 (step S708). The policy, for example, includes a plurality of hints, and the hints define operations to be executed by a specific object in the electronic apparatus 22, and are transmitted to the electronic apparatus 22 for implementation.

According to the aforementioned semi-supervised learning method, only a small amount of training data is used to predict the machine learning model, and a large amount of unlabelled data is used to train the machine learning model. In this way, the embodiment can achieve a better prediction result by only providing a small amount of samples.

Referring back to the flow of FIG. 3, finally, when the electronic apparatus 22 receives the policy transmitted back by the server 21 through the communication module 222, the self-healing module 228 transforms the policy into rules adapted for the electronic apparatus 22 and performs the self-healing according to the rules (step S308). There are two methods for the electronic apparatus 22 to transform the rules, and one is to merge the above rules with the function of the corresponding component, and the other one is to remove the function of the corresponding component first and then add the rules, though the embodiment is not limited thereto.

In detail, the self-healing module 228, for example, compares the original function and the function modified by applying the rules side by side, and if the difference is not large, the self-healing module 228 merges the difference with the original function. Conversely, if the difference is large, the rules can be directly used to cover the function of the corresponding component, or the function of the corresponding component is removed to add the rules.

According to the above self-healing method, component update in the electronic apparatus can avoid influencing running of the service, and by using the server to assist analyzing the update result and setting the healing policy, the electronic apparatus can self-heal the bug or security hole produced after the component update, so as to provide a better and secure service.

A situation that a computer updates a kernel/driver is taken as an example to describe the aforementioned self-healing method below. The computer of the present embodiment adopts a Linux operating system, and the Linux operating system has an update daemon, which may periodically check updates in the update respiratory on the update server. When the update daemon spots an update but cannot ensure system sanity after the update, it seeks assistance from the cloud server, and transmits the self-diagnosis data of the computer to the cloud server, such that the machine learning model on the cloud server analyzes the self-diagnosis data. The self-diagnosis data includes environment parameters, problems, or symptoms of the computer, though the invention is not limited thereto.

The cloud server uses the machine learning model to analyze the diagnosis data, sets a policy used for healing the computer, and transmits the policy back to the computer. The policy includes, for example, information such as dependencies of a kernel/driver, or a hardware compatibility list. In this case, an agent program in the computer transforms the policy into rules such as a function symbol table, or a file diff, and tries to merge the rules into the function of the binaries (for example, an ELF executable file) of the kernel/driver, or removes the original function to add the function applying the rules. In this way, the computer of the present embodiment can heal the program bug or security hole probably caused by the update during the update process.

In summary, in the method, system and server for self-healing of electronic apparatus of the invention, an incremental patching method is adopted to actively or passively update the components installed in the electronic apparatus without influencing running of the service on the electronic apparatus. After the component update is completed, if the electronic apparatus cannot self-maintain a normal operation of the components, the electronic apparatus automatically transmits a result of self-diagnosis to the server, and the server uses the machine learning model to generate a policy for self-healing and provides the same to the electronic apparatus. Finally, the electronic apparatus can realize self-healing by simply transforming the policy into rules adapted for itself. In this way, a maintenance burden on the network manager is mitigated and a stable service quality is provided.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A self-healing method of an electronic apparatus, adapted to execute self-healing when at least one component in an electronic apparatus is updated, and comprising:
    obtaining a clone of components installed in the electronic apparatus;
    for each of the components in the clone:
        in response to the component in the clone having an update, executing the update to the component in the clone; and
        updating the component corresponding to the update in the electronic apparatus by using the clone in response to a sanity of the update being confirmed;
    executing a self-diagnosis on the updated electronic apparatus to produce a diagnosis result;
    obtaining at least one policy based on the diagnosis result for healing the electronic apparatus; and
    transforming the at least one policy into at least one rule adapted for the electronic apparatus, and performing the self-healing according to the rules.

2. The method according to claim 1, wherein for each of the components in the clone, before the step of updating the component corresponding to the update in the electronic apparatus by using the clone, the method further comprises:
    performing a simulation and a testing on the updated component in the clone to confirm the sanity of the update.

3. The method according to claim 1, wherein for each of the components in the clone, in response to the component having the update, the step of executing the update to the component in the clone further comprises;
    pushing a context of the component to a stack;
    executing the update to the component; and
    extracting the context from the stack and modifying the context.

4. The method according to claim 3, wherein for each of the components in the clone, before the step of updating the component corresponding to the update in the electronic apparatus by using the clone, the method further comprises:
    performing a simulation on the modified context and the update by using the clone to confirm the sanity of the update.

5. The method according to claim 3, wherein for each of the components in the clone, the step of updating the component corresponding to the update in the electronic apparatus by using the clone comprises:
    updating the component corresponding to the modified context and the update in the electronic apparatus by using the clone.

6. The method according to claim 1, wherein for each of the components in the clone, while updating the component corresponding to the update in the electronic apparatus by using the clone, the method further comprises:
    suspending programs running on the electronic apparatus.

7. The method according to claim 1, wherein after the step of obtaining the clone of the components installed in the electronic apparatus, the method further comprises:
    sequentially calling the components in the clone to check whether each of the components has an update.

8. The method according to claim 7, wherein the step of sequentially calling the components in the clone comprises:
    sorting the components according to at least one parameter of each of the components, so as to sequentially call the components, wherein the parameter comprises a risk level, a severity or a priority.

9. The method according to claim 1, wherein the step of obtaining at least one policy based on the diagnosis result for healing the electronic apparatus comprises:
    sending the diagnosis result to a server, wherein the server analyzes the diagnosis result to accordingly set the at least one policy for healing the electronic apparatus; and
    receiving the at least one policy from the server.

10. The method according to claim 1, wherein the step of transforming the at least one policy into at least one rule adapted for the electronic apparatus and performing the self-healing according to the rules comprises:
    merging the rules with a function of the corresponding component, covering the function of the corresponding component with the rules, or adding the rules after removing the function of the corresponding component.

11. An electronic apparatus, comprising:
    a communication interface;
    a processor, configured to:
        obtain a clone of components installed in the electronic apparatus;
        for each of the components in the clone:
            in response to the component in the clone having an update, execute the update to the component in the clone; and
            update the component corresponding to the update in the electronic apparatus by using the clone in response to a sanity of the update being confirmed;
        execute a self-diagnosis on the updated electronic apparatus to produce a diagnosis result;
        obtain at least one policy based on the diagnosis result for healing the electronic apparatus through the communication interface; and
        transform the at least one policy into at least one rule adapted for the electronic apparatus, and performing the self-healing according to the rules.

12. The electronic apparatus according to claim 11, wherein for each of the components in the clone, before updating the component corresponding to the update in the electronic apparatus by using the clone, the processor further performs a simulation and a testing on the updated component in the clone to confirm the sanity of the update.

13. The electronic apparatus according to claim 11, wherein for each of the components in the clone, in response to the component having the update, the processor further pushes a context of the component to a stack, executes the update to the component, extracts the context from the stack, and modifies the context.

14. The electronic apparatus according to claim 13, wherein for each of the components in the clone, before updating the component corresponding to the update in the electronic apparatus by using the clone, the processor further performs a simulation on the modified context and the update by using the clone to confirm the sanity of the update.

15. The electronic device according to claim 13, wherein for each of the components in the clone, the processor updates the component corresponding to the modified context and the update in the electronic apparatus by using the clone.

16. The electronic device according to claim 11, wherein for each of the components in the clone, while updating the component corresponding to the update in the electronic apparatus by using the clone, the processor further suspends programs running on the electronic apparatus.

17. The electronic device according to claim 11, wherein after obtaining the clone of the components installed in the electronic apparatus, the processor further sequentially calls the components in the clone to check whether each of the components has an update.

18. The electronic device according to claim 17, wherein the processor sorts the components according to at least one parameter of each of the components, so as to sequentially call the components, wherein the parameter comprises a risk level, a severity or a priority.

19. The electronic device according to claim 11, wherein the processor sends the diagnosis result to a server through the communication interface, wherein the server analyzes the diagnosis result to accordingly set the at least one policy for healing the electronic apparatus, and wherein the processor receives the at least one policy from the server through the communication interface.

20. The electronic device according to claim 11, wherein the processor merges the rules with a function of the corresponding component, covers the function of the corresponding component with the rules, or adds the rules after removing the function of the corresponding component.

* * * * *